US010226797B1

(12) United States Patent
Griffiths

(10) Patent No.: US 10,226,797 B1
(45) Date of Patent: Mar. 12, 2019

(54) METHOD OF CLEANING HIGH POWER CLUTCH

(71) Applicant: Rolls-Royce North American Technologies Inc., Indianapolis, IN (US)

(72) Inventor: George F. Griffiths, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 15/699,518

(22) Filed: Sep. 8, 2017

(51) Int. Cl.
*B60B 9/00* (2006.01)
*B08B 9/032* (2006.01)
*B08B 3/00* (2006.01)
*F02B 77/04* (2006.01)

(52) U.S. Cl.
CPC .............. *B08B 9/032* (2013.01); *B08B 3/003* (2013.01); *F02B 2077/045* (2013.01)

(58) Field of Classification Search
CPC ...................................................... B08B 3/003
See application file for complete search history.

(56) References Cited

U.S. PATENT DOCUMENTS 1,584,505 A 5/1926 Bevins
2,632,544 A 3/1953 Hockert
6,131,701 A 10/2000 Camacho et al.
2016/0178016 A1 6/2016 Swift et al.
2016/0230592 A1* 8/2016 Saenz .................. F01D 25/002
2017/0227067 A1 8/2017 Bouton et al.
2017/0307026 A1 10/2017 Bouton et al.

FOREIGN PATENT DOCUMENTS

WO 2012040208 A2 3/2012

* cited by examiner

*Primary Examiner* — Mikhail Kornakov
*Assistant Examiner* — Ryan L. Coleman
(74) *Attorney, Agent, or Firm* — Barnes & Thornburg LLP

(57) ABSTRACT

A method of cleaning a clutch included in a drive train is disclosed in this paper. The method includes dispensing a cleaning agent, preferably a foamed cleaning agent, into the clutch. The clutch optionally includes clutch plates with evacuation channels formed in the clutch plates designed to carry cleaning agent and/or debris away from engagement surfaces of the clutch plates.

17 Claims, 3 Drawing Sheets

METHOD OF CLEANING HIGH POWER CLUTCH

FIELD OF THE DISCLOSURE

The present disclosure relates generally to clutches used in high power systems to selectively transfer rotation, and more specifically to methods of cleaning such clutches.

BACKGROUND

A clutch is a mechanical device that selectively transmits rotation from a driving shaft to a driven shaft. When a clutch is engaged, the driven shaft is rotated with the driving shaft. When a clutch is disengaged, the driven shaft is freed from the driving shaft.

Some clutches designed for use in high power systems include multiple clutch plates that engage one another such that friction between clutch plates transmits rotation through the clutch when engaged. In such designs, clutch plates may wear over time creating debris within the clutch assembly.

SUMMARY

The present disclosure may comprise one or more of the following features and combinations thereof.

According to the present disclosure, a method of cleaning a clutch is disclosed. The method includes dispensing foamed cleaning agent into the clutch so that the foamed cleaning agent contacts friction plates of the clutch.

In illustrative embodiments, the method may include coupling a cleaning agent source to the clutch. The method may also include flushing the foamed cleaning agent along with other debris and grime out of the clutch so that the clutch is clean for further use in the transmission of rotation from a driving shaft to a driven shaft.

In illustrative embodiments, the method may include closing a clutch outlet. By closing the outlet, the foamed cleaning agent dispensed into the clutch may be retained in the clutch for a desired period.

In illustrative embodiments, the method may include rotating clutch components while the foamed cleaning agent is retained in the clutch to move the foamed cleaning agent around the clutch. Each of the friction plates may be formed to include evacuation channels formed in a surface of the friction plate facing along an axis of friction plate rotation. The evacuation channels may be shaped to carry the foamed cleaning solution radially outward away from the axis.

In illustrative embodiments, flushing the foamed cleaning agent may include dispensing a flushing agent into the clutch. The flushing agent may be water. The method may include rotating clutch components while the flushing agent is in the clutch to move the flushing agent around the clutch.

In illustrative embodiments, the clutch may be an air-cooled dry clutch. The clutch may include a case formed to include an inlet open to air during operation of the clutch and a plurality of friction plates housed in the case.

In illustrative embodiments, clutch may include a shaft that extends from inside the case to outside the case and the shaft may be formed to include perforations sized to carry the foamed cleaning agent radially through the shaft. Coupling a cleaning agent source to the clutch may include coupling the cleaning agent source to the inlet open to air. The case may be formed to include an outlet open to air during operation of the clutch. Flushing the foamed cleaning agent along with other debris and grime out of the clutch may include discharging foamed cleaning agent through the outlet.

In illustrative embodiments, each of the friction plates may be formed to include evacuation channels formed in a surface of the friction plate facing along an axis of friction plate rotation. The evacuation channels may be shaped to carry the foamed cleaning solution radially outward away from the axis.

According to the present disclosure, a method of cleaning a clutch may include coupling a cleaning agent source to the clutch. The method may also include dispensing foamed cleaning agent into the clutch so that the foamed cleaning agent contacts friction plates of the clutch. The method may further include rotating clutch components while the foamed cleaning agent is in the clutch to move the foamed cleaning agent around the clutch.

In illustrative embodiments, the method may include closing a clutch outlet. By closing the clutch outlet, the foamed cleaning agent dispensed into the clutch may be retained in the clutch during rotation of clutch components.

In illustrative embodiments, the method may include flushing the foamed cleaning agent along with other debris and grime from the clutch out of the clutch. Accordingly, the clutch may be clean for further use in the transmission of rotation from a driving shaft to a driven shaft.

In illustrative embodiments, the clutch may be an air-cooled dry clutch. The clutch may include a case formed to include an inlet open to air during operation of the clutch and a plurality of friction plates housed in the case.

In illustrative embodiments, the clutch may include a shaft that extends from inside the case to outside the case. The shaft may be formed to include perforations sized to carry the foamed cleaning agent radially through the shaft.

In illustrative embodiments, coupling a cleaning agent source to the clutch includes coupling the cleaning agent source to the inlet open to air. The case may be formed to include an outlet open to air during operation of the clutch. Flushing the foamed cleaning agent along with other debris and grime out of the clutch may include discharging foamed cleaning agent through the outlet.

In illustrative embodiments, each of the friction plates may be formed to include evacuation channels formed in a surface of the friction plate facing along an axis of friction plate rotation. The evacuation channels may be shaped to carry the foamed cleaning solution radially outward away from the axis.

These and other features of the present disclosure will become more apparent from the following description of the illustrative embodiments.

DETAILED DESCRIPTION

Figure 1:
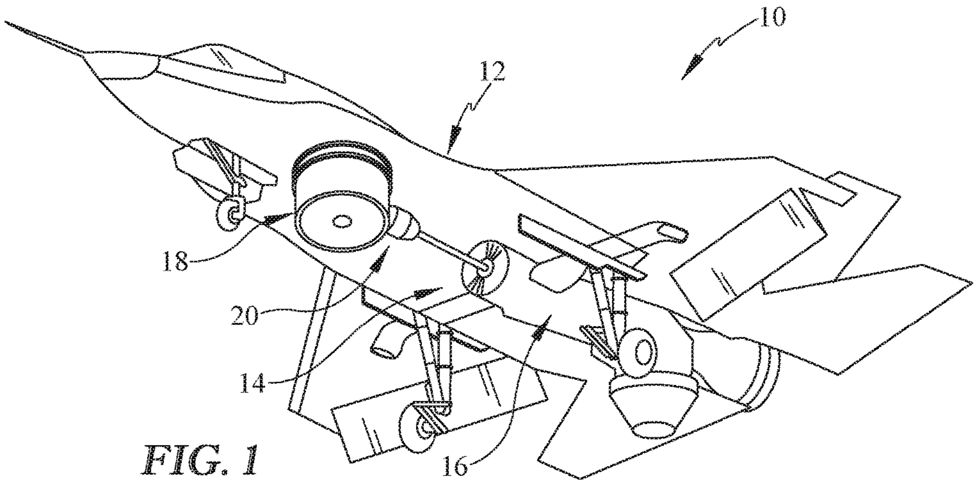
FIG. 1 is a perspective view of an aircraft including propulsion system having (i) a gas turbine engine that produces thrust and power to drive other systems, (ii) a lift fan that produces lift for take-off and landing, and (iii) a high power clutch configured to selectively transmit rotation from the gas turbine engine to the lift fan.

For the purposes of promoting an understanding of the principles of the disclosure, reference will now be made to a number of illustrative embodiments illustrated in the drawings and specific language will be used to describe the same.

Figure 2:
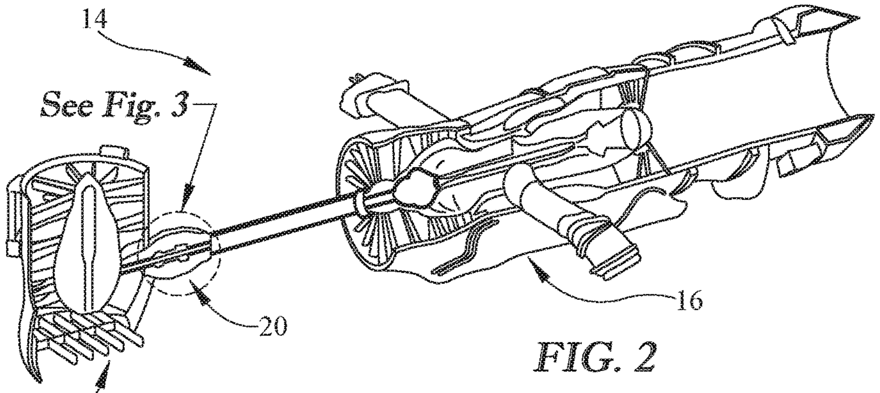
FIG. 2 is a perspective view of the propulsion system of FIG. 1 showing that the clutch is coupled between a driving shaft that extends from the gas turbine engine and a driven shaft that extends into the lift fan.

An aircraft 10 according to the present disclosure includes an airframe 12 and a propulsion system 14 as shown in FIGS. 1 and 2. The propulsion system 14 provides thrust to move the airframe 12 during takeoff, flight, and landing. Maintenance of propulsion system 14 can increase the life and duty cycle of the propulsion system 14 so that the aircraft 10 has increased readiness for flight missions. In a specific example, a method 100 of cleaning internal components of a high power clutch 20 of the propulsion system 14 as described in this disclosure can lead to increased readiness.

The exemplary propulsion system 14 includes a gas turbine engine 16, a lift fan 18, and the high power clutch 20 as shown in FIGS. 1 and 2. The gas turbine engine 16 produces thrust for propelling the airframe 12 forward and power to drive other systems, such as the lift fan 18. The lift fan 18 produces thrust directed to provide lift for take-off and landing. The high power clutch 20 is selectively transmits rotation from the gas turbine engine 16 to the lift fan 18.

The clutch 20 is illustratively configured to facilitate a disclosed method of cleaning 100 in order to increase life and duty cycle of the clutch 20 and thereby increase readiness of the aircraft 10. The clutch 20 illustratively includes a case 22, an input shaft 24, an output shaft 26, and clutch plates 28 as shown in a simplified form in FIG. 3. The case 22 houses the shafts 24, 26 and the clutch plates 28. Hydraulic actuators (not shown) drive clutch plates 28 into engagement so as to couple output shaft 26 to input shaft 24 for rotation therewith during operation of the accessory lift fan 18.

The case 22 is illustratively shaped to define a clutch input 32 and a clutch output 34 that are open to air during operation of the propulsion system 14. The clutch input 32 of the exemplary embodiment opens facing upwardly when the aircraft 10 is in a generally flat flight or landed configuration as suggested in FIG. 3. The clutch output 34 of the exemplary embodiment opens facing downwardly when the aircraft 10 is in a generally flat flight or landed configuration as suggested in FIG. 3.

Figure 3:
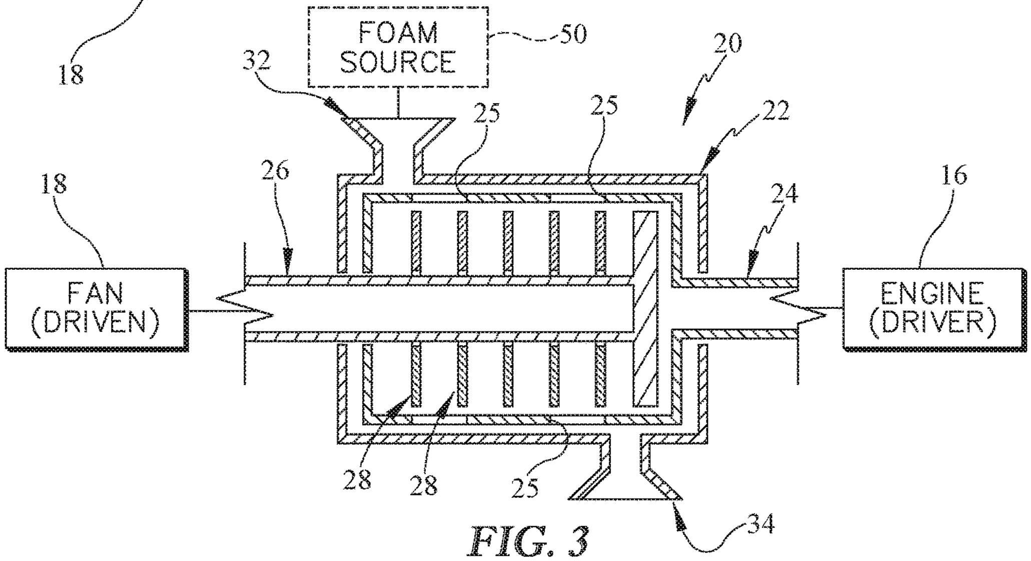
FIG. 3 is a partially diagrammatic view of the propulsion system of FIGS. 1 and 2 with a simplified cross sectional view of the clutch showing that a cleaning agent source may be coupled to the clutch to dispense a foamed cleaning solution into the clutch to clean friction plates in the clutch.

The input shaft 24 extends from the engine 16 into the case 22 as shown in FIG. 3. The input shaft 24 is shaped to house clutch plates 28 arranged in the case 22. The input shaft 24 is illustratively formed to include perforations 25 sized to carry a foamed cleaning agent radially through the input shaft 24 and into contact with clutch plates 28.

The output shaft 26 extends from inside the case 22 to the lift fan 18 as shown in FIG. 3. The output shaft 26 also illustratively extends through the clutch plates 28.

Figure 5:
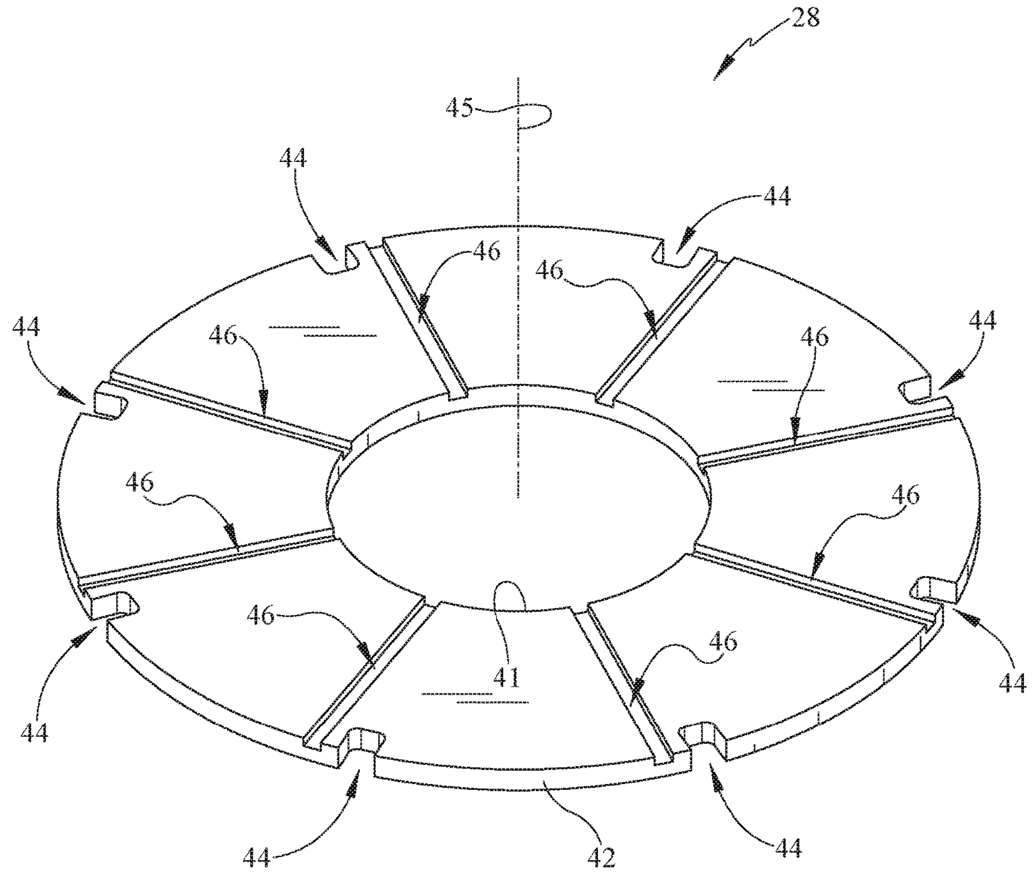
FIG. 5 is a perspective view of one of the friction plates included in the clutch of FIGS. 1-3 showing that each friction plate is formed to include excavation channels shaped to carry cleaning solution and/or debris away from a primary surface of the friction plate.

The clutch or friction plates 28 of the exemplary embodiment comprise primarily carbon materials designed to handle high temperatures during operation. Each clutch plate 28 is formed to include a central aperture 40 and has an inner diameter 41 and an outer diameter 42 that extend around an axis 45 as shown in FIG. 5. Anti-rotation notches 44 are extend into the clutch plates 28 from the outer diameter 42. Evacuation channels 46 are formed in a face or surface 48 of the clutch plates 28 facing along the axis 45 about which the friction plates 28 rotate.

The evacuation channels 46 of the clutch plates 28 illustratively extend from the inner diameter 41 to the outer diameter 42 of each plate 28 and are shaped/sized to carry a foamed cleaning solution radially outward away from the axis 45 as shown in FIG. 5. The evacuation channels 46 may carry dirt/debris, cleaning agents, flushing agents, etc away from the axis 45 and away from engagement surfaces of the clutch plates 28. Accordingly, the engagement surfaces of the clutch plates 28 may be relatively free for contact with other clutch components when the clutch 20 is transferring rotation from a driving shaft to a driven shaft.

During operation of the clutch 20 used for powered assisted lift is formed to include evacuation channel features 46 on the surface of the clutch plates 28 can aide in providing the function of moving air across the surfaces and to aide in evacuating debris. These evacuation channels 46 may provide a way to allow cleaning solution to be administered within the housing or case 22 of the clutch 20. The effect may include enhanced performance during operation and may extend the service life of the clutch 20 as well; whilst reducing the debris collected inside the housing or case 22.

During operation of the clutch 20 a significant amount of debris can collect inside the case or housing 22 of the clutch. A method 100 to clean the clutch 20 and extend the service life using nucleated foam or other cleaning agents is provided in this disclosure. The method 100 to clean can incorporate the use of a service cart to rotate the clutch 20 while installed in the aircraft 10. The design of the clutch 20 having ports to air cool the clutch 20 during operation provides an inlet and outlet 32, 34 that may be used for facilitating the cleaning process.

Figure 4:
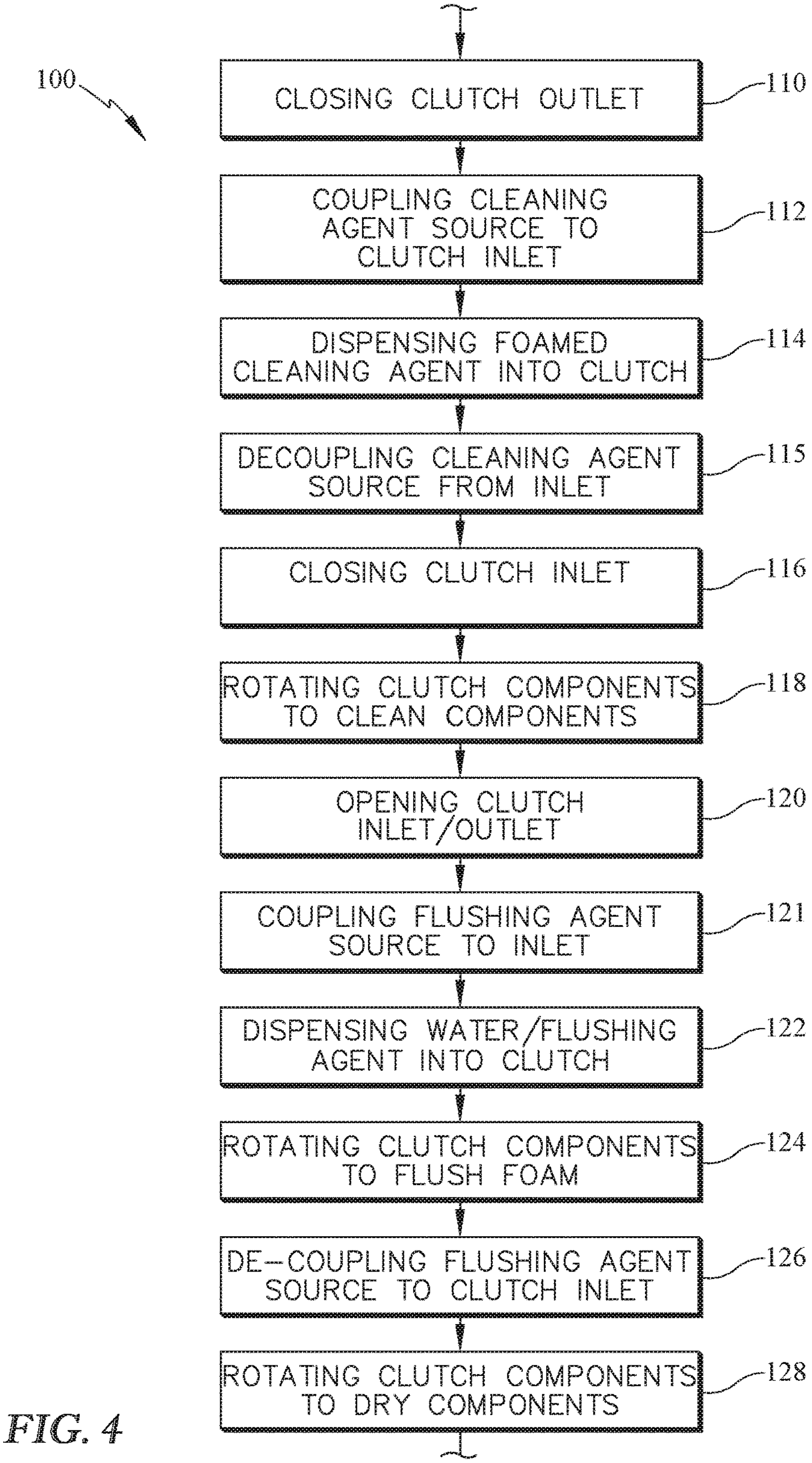
FIG. 4 is a diagram showing steps that may be included in a method of cleaning the clutch shown in FIGS. 1-3.

Turning specifically to FIG. 4, a method 100 for cleaning the high power clutch 20 is shown. In a step 110 of the method 100, a user may close the clutch outlet 34 off from atmosphere so that agents dispensed into the clutch 20 are retained in the clutch 20. In a step 112, a user may couple a cleaning agent source—specifically a nucleated foamed cleaning agent source 50—to the clutch inlet 32. In a step 114, the user may dispense cleaning agent into the clutch 20 in order to put cleaning agent in contact with clutch plates 28.

With cleaning agent in the clutch 20, in a step 115 of the method 100, a user may decouple the cleaning agent source from the clutch inlet 32. Then, in a step 116 a user may close the clutch inlet 32 to substantially close inside of the clutch case 22 from its surroundings. In a step 118, a user may rotate components of the clutch 20 to clean the clutch by causing the cleaning agent to move around the clutch 20. A service cart (not shown) may be used to drive rotation of the clutch components during cleaning.

Upon interaction of cleaning agent with the clutch plates 28 and other components of the clutch 20, in a step 120 of method 100, a user may open clutch inlet 32 and/or clutch outlet 34. In a step 121, a user may couple a flushing agent source to the clutch inlet 32. In a step 122, a user may dispense water or another flushing agent from the flushing agent source into clutch 20 through clutch inlet 32. In a step 124, a user may rotate clutch components while flushing agent is in and/or is being dispensed into the clutch 20 to flush cleaning agent from components of the clutch 20.

After flushing, in a step 126 of the method 100, a user may decouple the flushing agent source from the clutch inlet 32 as suggested in FIG. 4. In a step 128 of the method 100, a user may rotate clutch components to dry clutch components after cleaning and/or flushing.

The method 100 includes a number of steps that may be performed in the order shown or in other various orders. It is contemplated that not all the steps shown in the method 100 are required but rather the method 100 could be performed upon actions related to only a few of the steps described. In addition, other steps not shown can be added to the steps shown in the method 100 while remaining within the contemplated scope of the method. It is appreciated that while the clutch 20 of the present disclosure is incorporated into a propulsion system 14 for an aircraft 10, the teachings of the present disclosure may be suitable for use in other systems that include clutches.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of cleaning a clutch used to transmit rotation from a driving shaft to a driven shaft, the method comprising:

coupling a cleaning agent source to the clutch, closing a clutch outlet so that cleaning agent dispensed into the clutch is retained in the clutch for a desired period, dispensing foamed cleaning agent into the clutch so that the foamed cleaning agent contacts friction plates of the clutch, rotating clutch components while the foamed cleaning agent is retained in the clutch and while the clutch outlet is closed, and flushing the foamed cleaning agent along with other debris and grime out of the clutch so that the clutch is clean for further use in the transmission of rotation from a driving shaft to a driven shaft.

2. The method of claim 1, wherein each of the friction plates is formed to include evacuation channels formed in a surface of the friction plate facing along an axis of friction plate rotation, the evacuation channels shaped to carry the foamed cleaning solution radially outward away from the axis.

3. The method of claim 1, wherein flushing the foamed cleaning agent includes dispensing a flushing agent into the clutch.

4. The method of claim 3, wherein the flushing agent is water.

5. The method of claim 3, wherein the method includes rotating clutch components while the flushing agent is in the clutch to move the flushing agent around the clutch.

6. The method of claim 1, wherein the clutch is an air-cooled dry clutch and the clutch includes a case formed to include an inlet open to air during operation of the clutch and a plurality of friction plates housed in the case.

7. The method of claim 6, wherein the clutch includes a shaft that extends from inside the case to outside the case and the shaft is formed to include perforations sized to carry the foamed cleaning agent radially through the shaft.

8. The method of claim 6, wherein coupling a cleaning agent source to the clutch includes coupling the cleaning agent source to the inlet open to air.

9. The method of claim 8, wherein the case is formed to include an outlet open to air during operation of the clutch and flushing the foamed cleaning agent along with other debris and grime out of the clutch includes discharging foamed cleaning agent through the outlet.

10. The method of claim 9, wherein each of the friction plates is formed to include evacuation channels formed in a surface of the friction plate facing along an axis of friction plate rotation, the evacuation channels shaped to carry the foamed cleaning solution radially outward away from the axis.

11. A method of cleaning a clutch used to transmit rotation from a driving shaft to a driven shaft, the method comprising coupling a cleaning agent source to the clutch, closing a clutch outlet so that cleaning agent dispensed into the clutch is retained in the clutch for a desired period, dispensing foamed cleaning agent into the clutch so that the foamed cleaning agent contacts friction plates of the clutch, and rotating clutch components while the foamed cleaning agent is in the clutch and while the clutch outlet is closed.

12. The method of claim 11, wherein the method further comprises flushing the foamed cleaning agent out of the clutch so that the clutch is clean for further use to transmit rotation from the driving shaft to the drive shaft.

13. The method of claim 12, wherein the clutch is an air-cooled dry clutch and the clutch includes a case formed to include an inlet open to air during operation of the clutch and a plurality of friction plates housed in the case.

14. The method of claim 13, wherein the clutch includes a shaft that extends from inside the case to outside the case and the shaft is formed to include perforations sized to carry the foamed cleaning agent radially through the shaft.

15. The method of claim 13, wherein coupling a cleaning agent source to the clutch includes coupling the cleaning agent source to the inlet open to air.

16. The method of claim 15, wherein the case is formed to include an outlet open to air during operation of the clutch and flushing the foamed cleaning agent out of the clutch includes discharging foamed cleaning agent through the outlet.

17. The method of claim 16, wherein each of the friction plates is formed to include evacuation channels formed in a surface of the friction plate facing along an axis of friction plate rotation, the evacuation channels shaped to carry the foamed cleaning solution radially outward away from the axis.

* * * * *